United States Patent [19]

Lindsay

[11] Patent Number: 5,218,876
[45] Date of Patent: Jun. 15, 1993

[54] CONTROL DEVICE FOR A TILTABLE MOUNTING HEAD

[75] Inventor: Richard A. Lindsay, Eye, United Kingdom

[73] Assignee: Vinten Group PLC, Bucks, England

[21] Appl. No.: 678,317

[22] PCT Filed: Feb. 2, 1990

[86] PCT No.: PCT/GB90/00167

§ 371 Date: Aug. 9, 1991

§ 102(e) Date: Aug. 9, 1991

[87] PCT Pub. No.: WO90/09544

PCT Pub. Date: Aug. 23, 1990

[30] Foreign Application Priority Data

Feb. 10, 1989 [GB] United Kingdom ............... 8902970

[51] Int. Cl.⁵ .................... F16H 21/44; F16M 11/10
[52] U.S. Cl. ........................................ 74/96; 74/98; 248/281.1; 354/293; 414/917
[58] Field of Search ............... 74/96, 98, 105; 248/184, 185, 281.1, 371; 354/293; 414/917

[56] References Cited

U.S. PATENT DOCUMENTS

| 2,326,657 | 8/1943 | Johnston | 248/184 X |
| 2,548,476 | 5/1951 | Horstmann | 248/281.1 |
| 3,263,516 | 8/1966 | Chisholm | 74/105 |
| 3,883,105 | 5/1975 | Matsumoto | 414/917 X |
| 3,995,797 | 12/1976 | Knight | 248/184 |
| 4,067,245 | 1/1978 | Santic' et al. | 74/96 |

FOREIGN PATENT DOCUMENTS

| 1324843 | 7/1987 | U.S.S.R. | 414/917 |
| 1414622 | 8/1988 | U.S.S.R. | 414/917 |

Primary Examiner—Allan D. Herrmann
Assistant Examiner—David W. Laub
Attorney, Agent, or Firm—Lee, Mann, Smith, McWilliams, Sweeney & Ohlson

[57] ABSTRACT

A control device for a tiltable mounting head, such as the mounting head for a camera, has a three element pantographic linkage including a rigid control arm of which an intermediate point is constrained to move along a horizontal path. One end of the arm is pivotally mounted to an arm carrying the tiltable head, while the other end is pivotally mounted to a locating arm whose remote end is pivoted to fixed structure. The relative angular position of the two arms is controlled by two parallelogram linkages with different degrees of fold and having the central arm in common, whereby one of the two linkages is always laterally spaced from the arm. Alternatively the two arms may be secured to respective sprockets pivoted to the arm and connected together by a chain.

4 Claims, 1 Drawing Sheet

CONTROL DEVICE FOR A TILTABLE MOUNTING HEAD

FIELD OF THE INVENTION

This invention relates to a control device for a tiltable mounting head.

PRIOR ART

A pantographic control device for a tiltable mounting head, for example a mounting head for a camera or antenna, is known from U.K. Specification No. 1451088, to which reference may be made for a fundamental understanding of a pantographic tilt control mechanism. The control device described in this specification provides the substantial advantage that, during tilting, the centre of gravity of an item of equipment mounted on the mounting head, is constrained to move along a horizontal path, so that the weight of the item does not have a variable effect on the tilting action.

The known arrangement is effective for angles of tilt up to a limit of about 40 degrees. Beyond this angle of tilt the arrangement can become unstable.

It is an object of this invention to provide an improved pantographic control device which remains effective up to much larger angles of tilt for removing a variable weight factor from the tilting action.

THE INVENTION

According to the invention, there is provided a control device for a tiltable mounting head, comprising a three element pantographic linkage having two outer elements secured by a central element, wherein the relative angular position of the two outer elements is controlled by at least two intermediate links joined to the outer elements so that, irrespective of the relative angular position of said two outer elements, at least one of the intermediate links is always laterally spaced from the central element even if another intermediate link is aligned with the central element, and means constraining a point of the central element to move along a horizontal axis.

Thus, the major problem with the known control device described above is that the angle of tilt permissible can only be increased by allowing the pantograph linkage to pass through the position in which the links become aligned. However, this results in the problem that, in the in-line condition of the links, the device becomes unstable due to the fact that the weight of the camera or other item of equipment is completely counterbalanced through its centre of gravity, so that the pantograph may fold either way out of the in-line condition if tilting movement is continued.

In accordance with the invention, this problem is resolved by the use of two intermediate links, arranged so that stability is always maintained by at least one of them, even when the other passes through a condition which does give rise to instability.

In one embodiment, the intermediate links are rigid members each pivotally connecting between the two outer members, effectively to form two parallelogram linkages having the central element in common, with differing degrees of fold for any angle of tilt in the range. This range can be up to 360 degrees, but usually a range of 180 degrees is the maximum required.

The same result is achievable in another embodiment by intermediate links constituted by the opposed parallel runs of a chain or belt which passes around outer elements in the form of gear wheels or pulleys, a toothed arrangement being preferred. In this second embodiment, the central element is a rigid element interconnecting the axes of rotation of the two outer elements.

DESCRIPTION OF EMBODIMENTS

The invention will be further explained in the following description of two embodiments, which are diagrammatically shown in FIGS. 1 and 2 of the accompanying drawings, respectively.

In both embodiments of the invention, the control device is a pantographic-type linkage system having a central element and two outer elements.

Figure 1:
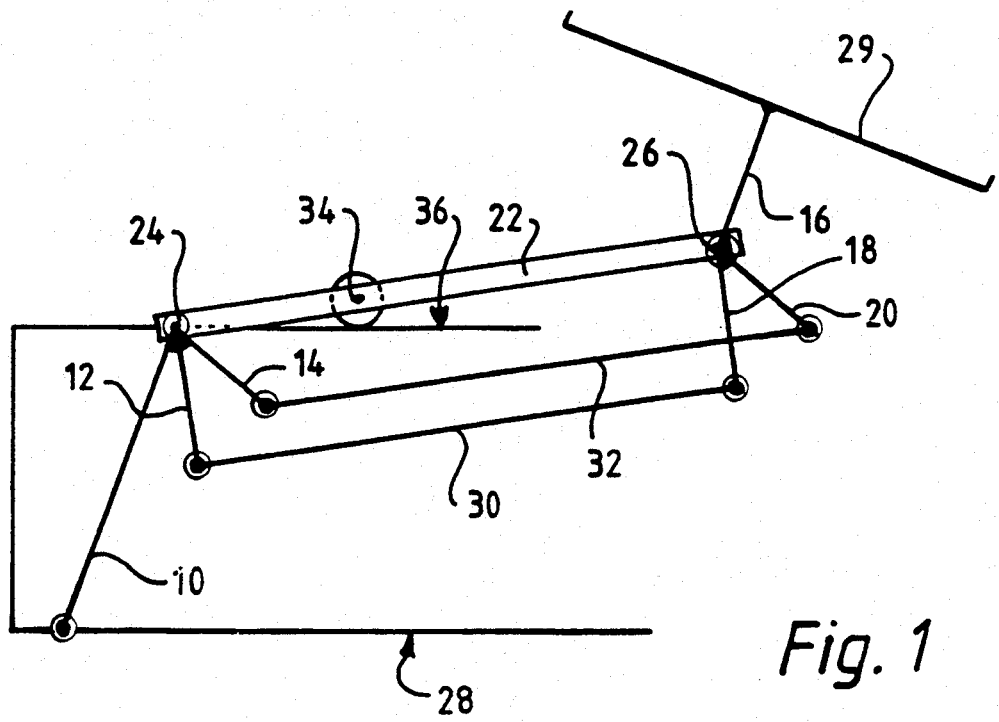
FIG. 1 shows a first embodiment of the invention where the outer elements of the pantographic-type linkage are legs.

In the embodiment of FIG. 1, the outer elements each comprise a rigid arrangement of three legs in tripod-like formation, namely legs 10, 12 and 14 for one outer element and legs 16, 18 and 20 for the other outer element. The central element comprises a rigid arm 22 which pivotally connects at its opposite ends to the apices or junctions 24, 26 of the respective three-legged outer elements.

Leg 10 of the one outer element, at its end remote from the apex 24, has a pivotal connection to a fixed support structure 28, whilst corresponding leg 16 of the other outer element, at its end remote from the apex 26, fixedly carries a mounting plate 29 (or other mounting head) for a camera or other item of equipment which is to be controllably tiltable, usually by manual effort applied directly to the item.

The other legs 12, 14 and 18, 20 of the two outer elements provide for the pivotal interconnection, between the two outer elements, of two intermediate links 30, 32, in such a manner that two non-coplanar parallelogram linkage arrangements are formed, the two arrangements having the rigid arm 22 in common. Thus, one parallelogram linkage arrangement comprises the elements, 22, 12, 30 and 18 and the other comprises the elements 22, 14, 32 and 20.

Point 34 of the rigid arm 22 is constrained to move along a horizontal path or locus 36 defined by the fixed structure 28, e.g. by means of a pin and slot arrangement.

With the afore-described arrangement, the centre of gravity of a camera or other item mounted on the mounting plate 29 may be constrained to move in a horizontal path as the mounting plate is tilted, so that the weight of the item has no variable effect on the tilting action.

However, the above-described two parallelogram linkage arrangements 22, 12, 30, 18 and 22, 14, 32, 20, are also so arranged that, at any given angle of tilt throughout a range of tilt up to 180 degrees (although up to 360 degrees is theoretically feasible), the conditions of fold of the two arrangements are different. Thus, when one such linkage arrangement passes through an in-line condition potentially giving rise to instability, stability is in fact maintained by the non-in-line condition of the other arrangement. It is this feature which enables the stated wide range of tilt angle to be achievable.

Figure 2:
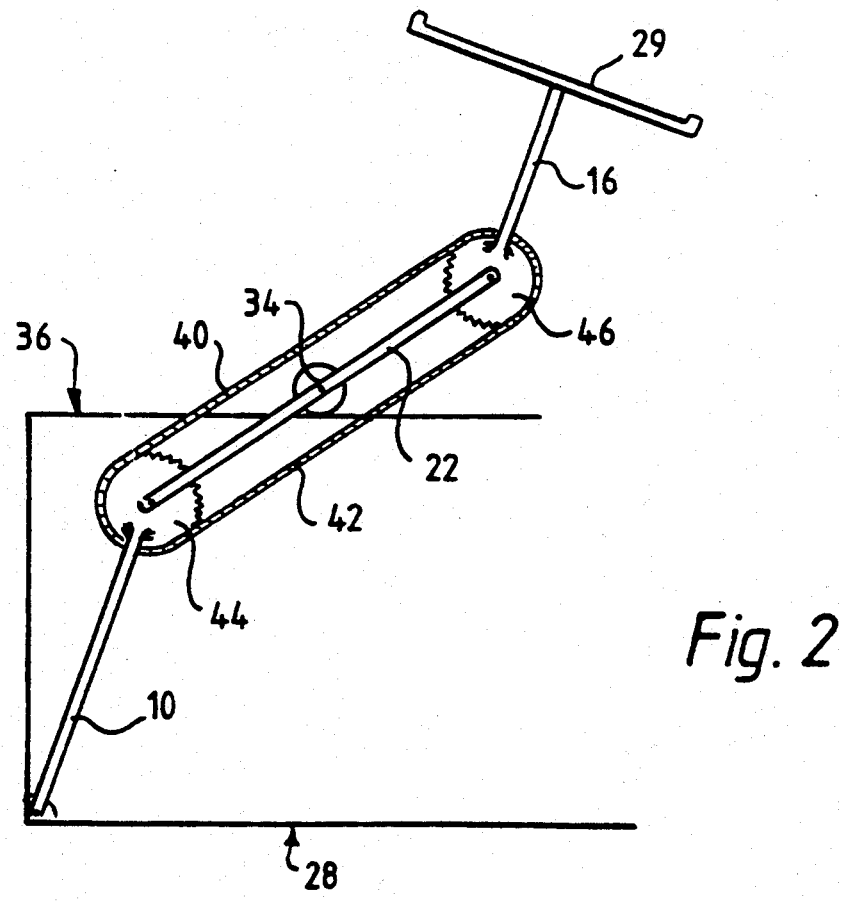
FIG. 2 shows a second embodiment where the outer link of element is a chain.

The second embodiment shown in FIG. 2, whilst appearing a totally different arrangement, is in fact a modification of the arrangement of FIG. 1, wherein the two rigid intermediate arms are replaced by the opposite runs 40, 42 of a chain or toothed belt, and the two arms 12, 14 and 18, 20 of the two outer elements in FIG. 1 are respectively embodied as radii of two gear wheels or pulleys 44, 46. The central element, again referenced 22, connects between the axes of the two gear wheels, and a point 34 thereof is constrained to move in a horizontal path or locus, in like manner to the arrangement of FIG. 1.

Arm 10 integrally formed with one gear wheel 44 is pivotally connected at its remote end to the fixed structure 28, and arm 16 integrally formed with the other gear wheel 46 fixedly carries the mounting plate 29.

Thus, the embodiment of FIG. 2 is operational in analogous manner to the embodiment of FIG. 1.

Adjustment to compensate for variation due to differing positions of the centre of gravity of different payloads, is affected by altering the position of the roller 34 along the length of the intermediate strut 22.

I claim:

1. A tiltable mounting head for supporting a payload for tilting about a horizontal axis on a base comprising a three element pantographic linkage movable in a vertical plane and having a central element, first and second outer elements, means to mount the first and second outer elements for rotation at spaced locations on the second element, means for mounting the first outer element for pivotal movement about a horizontal axis with respect to a base, means for receiving and mounting a payload on the second outer element, guide means on the central element and a horizontally extending guide way for constraining the guide means to move in a horizontal direction whilst allowing the central element to tilt about the guide means and drive means providing a one to one transmission between the first and second elements to cause the first member to replicate movements of the second member whereby the centre of gravity of a payload on the second element is maintained at the same horizontal level with respect of the guide means; the improvement comprising providing a drive means between the first and second elements capable of transmitting torque between the first and second elements whatever the rotational positions of said elements with respect to the centre element.

2. A tiltable mounting based according to claim 1, wherein said drive means between the first and second elements comprises first and second parallel linkages each having end links fast for rotation with the first and second outer elements of the pantographic linkage, the parallel linkages being arranged with a phase angle between them so that if one of the linkages moves into alignment with the central link of the pantographic linkage and so is unenable to transmit a torque between the first and second elements, the other linkage is out of alignment with the central element and so is capable of transmitting torque.

3. A controlled device according to claim 1, wherein the drive between the first and second elements comprises a pair of pulleys rotatably mounted at spaced locations along the central element to which the first and second outer elements are fixed and an endless belt encircling the pulleys.

4. A mounting head according to claim 1, wherein the drive means between the first and second outer elements comprises a pair of toothed wheels mounted at spaced locations along the central element to which the first and second outer elements are fixed respectively and a chain encircling the toothed wheels.

* * * * *